United States Patent
Vrachan et al.

(10) Patent No.: US 7,568,803 B2
(45) Date of Patent: Aug. 4, 2009

(54) AERIAL DISPLAY SYSTEM WITH LOW COST PLASTIC SPHERICAL MIRROR

(75) Inventors: Jeffrey L. Vrachan, Agoura Hills, CA (US); Curtis L. Thornton, Simi Valley, CA (US)

(73) Assignee: Provision Interactive Technologies, Inc., Chatsworth, CA (US)

( * ) Notice: Subject to any disclaimer, the term of this patent is extended or adjusted under 35 U.S.C. 154(b) by 0 days.

(21) Appl. No.: 11/843,144

(22) Filed: Aug. 22, 2007

(65) Prior Publication Data

US 2007/0285791 A1    Dec. 13, 2007

Related U.S. Application Data

(63) Continuation-in-part of application No. 11/105,857, filed on Apr. 14, 2005.

(60) Provisional application No. 60/839,740, filed on Aug. 23, 2006.

(51) Int. Cl.
  *G03B 21/26* (2006.01)
  *G03B 21/28* (2006.01)
  *G03B 21/60* (2006.01)
  *G02B 27/24* (2006.01)
  *G02F 1/1335* (2006.01)

(52) U.S. Cl. .............. 353/7; 353/57; 353/50; 353/119; 359/458; 359/471; 349/5; 349/15

(58) Field of Classification Search .......... 353/7–8, 353/57, 59, 50, 119, 122; 359/458, 462, 359/471, 495; 345/3.1, 87; 349/5, 7, 15
See application file for complete search history.

(56) References Cited

U.S. PATENT DOCUMENTS

| | | | |
|---|---|---|---|
| 5,963,302 A | 10/1999 | Wittek | 352/38 |
| 6,076,638 A | 6/2000 | Gertz | 187/414 |
| 6,556,272 B1 | 4/2003 | Du et al. | 352/85 |
| 6,598,976 B2 * | 7/2003 | Westort et al. | 353/28 |
| 6,602,475 B1 | 8/2003 | Chiao | 422/124 |
| 6,607,275 B1 | 8/2003 | Cimini et al. | 353/28 |
| 6,693,682 B2 * | 2/2004 | Fujishiro et al. | 349/65 |
| 6,744,488 B2 | 6/2004 | Schermerhorn | 352/85 |
| 6,808,268 B2 * | 10/2004 | Vrachan et al. | 353/10 |
| 6,817,716 B1 | 11/2004 | Hines | 353/10 |
| 6,848,219 B2 | 2/2005 | Standard et al. | 52/6 |
| 2005/0094103 A1 * | 5/2005 | Robinson et al. | 353/10 |

* cited by examiner

*Primary Examiner*—Diane I Lee
*Assistant Examiner*—Magda Cruz
(74) *Attorney, Agent, or Firm*—J.C. Patents

(57) ABSTRACT

An aerial display system comprising inexpensive optical elements and a highly brightened LCD display or similar video image display types provides floating images in an expensive enclosure. In the aerial display system, either an anti-reflective acrylic plastic layer or a circular polarizer is disposed proximate and parallel to a beam splitter so that the focal point of the floating image is proximate to the plastic layer or polarizer. This image position yields both a wider filed of view and wider perceived field of view. The aerial projection system includes a plastic spherical mirror of low cost, which includes a plastic part of at least the following descriptions: mirror surface supported by wall structures of sufficient sphericity, of a plastic material formulation, having excellent optical grade finish, a reflective metal coating, and a protective overcoat.

15 Claims, 7 Drawing Sheets

AERIAL DISPLAY SYSTEM WITH LOW COST PLASTIC SPHERICAL MIRROR

CROSS-REFERENCE TO RELATED APPLICATION

This application claims the priority benefit of U.S. Provisional Application No. 60/839,740, filed on Aug. 23, 2006, now pending. This is a continuation-in-part application of U.S. patent application Ser. No. 11/105,857, filed on Apr. 14, 2005, now pending. The entirety of each of the above-mentioned patent applications is hereby incorporated by reference herein and made a part of this specification.

BACKGROUND OF THE INVENTION

1. Field of the Invention

Embodiments of the present invention relate to aerial display system. More particularly, embodiments of the present invention relate to an optimized aerial display system for consumer display applications having a low cost plastic spherical mirror.

2. Description of the Background Art

Aerial display systems generate images that appear to float in the air several inches in front of the display device. Aerial display systems have been used for many years because of the novelty associated with a floating image.

Conventional aerial display systems are typically housed in a wooden structure that resembles a large box the size of a refrigerator. Inside the structure, a region for displaying the static item is in optical alignment with optical components that generate an aerial image of the static item. By way of example, a shoe or a food item may be positioned in the display region to generate a floating 2D image of the item. In some applications, the display region comprises a video display device, such as a cathode ray tube (CRT) or a liquid crystal display (LCD) that generates a floating video image. The HOLOVISION™ display system, developed by Provision Entertainment, the assignee of the present application, provides realistic floating three-dimensional video images using a high bright LCD that achieves a very black background rather than a grayish black background. HOLOVISION is a trademark of Provision Entertainment.

Unfortunately, conventional aerial display systems require a very large form factor for achieving a realistic floating or aerial image, are very heavy, and are very expensive. Thus, their use has been limited to commercial applications such as product demonstrations at conventions or trade shows or to display expensive objects such as jewelry or objects of museum quality.

Another problem with conventional aerial display systems arises from the expensive optical elements, specifically a beam splitter, a glass spherical mirror, and a circular polarizer, that are used to generate the floating image. For example, the spherical mirror is typically an expensive highly polished glass substrate with low distortion that costs over US $ 1,000 for an average sized display unit. Further, while the polarizer prevents a viewer's reflection from polluting the floating image, it is also a very expensive element.

Because of the high cost of conventional aerial display systems, such systems have not been widely adopted by many businesses and even fewer consumer applications include an aerial projection display system. Indeed, conventional aerial display systems are limited to museum and trade show applications where the high cost of the system can be justified by its ability to attract attention. Clearly, what is needed is a low cost aerial projection system that can be used for consumer and business applications. As interactive gaming achieves greater popularity, the ability to project three-dimensional objects from the computer display toward the viewer will enhance realism. Thus, there is a great need for a low-cost aerial display system that may be included as a part of a home entertainment system, computer display, or as part of an interactive gaming application, by way of example, rather than to limit the use of aerial projection systems to museums or trade show applications. What is also needed is an aerial projection system that may be used in both the home environment and in commercial applications in ambient lighting conditions. What is also needed is an aerial projection system that is lightweight and easily adaptable to a variety of applications without the constraint of using the heavy and expensive glass spherical mirrors used in the conventional aerial display systems.

Indeed, glass has been the conventional material of choice for use as spherical mirror. One of the most important reasons is because plastics technologies were not as developed as they are today. In other words, the tools and materials were not available as they are today. The metal mold tolerances and the resulting parts can be specified and held in the tens of thousandths of an inch. Materials used today are more sophisticated; the plastics are able to emulate the thermal stability and durability similar to that of glass, and to endure the type of operating conditions in the past that only glass could have tolerated. Glass spherical mirrors are expensive because of the secondary operations needed to prepare the mirror surface after it is heat formed or slumped to shape. These secondary operations include annealing, grinding and polishing. The annealing process is used to strengthen the glass so that it is strong enough to undergo the grinding and polishing operation, as well as adding the additional strength needed to resist breakage during usage. The grinding and polishing stages are necessary because of the limits of the tolerance capabilities of glass forming molds and the physical nature of glass. Unfortunately, the grinding and polishing stages require a considerable amount of manual processing for producing a finished product; therefore, they are often considered semi-automated processes.

In addition, Glass also has the serious drawbacks of breakage, weight, and expensive shipping costs. To try to overcome the limitations and drawbacks of glass, a low-cost glass forming process was developed. However, the low-cost glass forming process did not provide an acceptable surface finish, and the resulting cost reductions were not comparable to that of plastic. Clearly, what is also needed is a method and system for manufacturing a plastic part to reduce the weight of a spherical mirror to approximately one-third that of glass, and for making a low-cost plastic spherical mirror of comparable performance to glass spherical mirror.

SUMMARY OF THE INVENTION

The embodiments of the present invention provide an improved aerial display system. More specifically, the embodiments of the present invention provide an improved aerial display system which includes low cost optical components including a low cost plastic spherical mirror maintained in optical alignment in a low cost housing. The system has a wider apparent field of view and true three-dimensional effects from a flat projection panel.

Embodiments of the present invention further provide a housing for an aerial display system that is aesthetically pleasing and that minimizes unwanted distortion of the floating image.

The embodiments of the present invention provide a method and system for manufacturing a low-cost plastic spherical mirror of comparable performance and optical tolerances as that of a glass spherical mirror.

In a first embodiment of the present invention, plastic injection molding is used for manufacturing the plastic part for a low-cost plastic spherical mirror. The injection molding method is able to yield higher tolerance, improved process control, and higher repeatability.

The metal mold for injection molding is able to hold a tight tolerance for a general envelope dimension for a mirror (not the mirror surface). The spherical radius tolerance is also able to be held at a tight tolerance. The aforementioned tolerances are comparable to that of glass spherical mirrors. A metal mold for injection molding is able to hold to a tight tolerance.

A plurality of plastic material formulations have been developed in which a plurality of performance criteria relating to material strength, thermal stability, water absorption, mold shrinkage, material flow into the mold, UL recognition, manufacturing considerations, surface density, lubricant content, and scratch resistance are satisfied. The selection of the plastic material formulation may be based upon the metal mold and part testing results.

Vacuum metallization or vacuum deposition may be used for depositing a reflective mirror coating for use as the mirror surface for the spherical mirror. The metal deposited on the plastic surface is preferably to be at a thickness of several microns. The metalizing phase is performed followed by spraying a protective overcoat onto the metalized surface. The vacuum metalized part is to have sufficient quality because of the improved quality control of the surface of the plastic material that is being coated by means of the ability to minimize the amounts of flaws on the plastic surface resulting from the molding process.

A method according to the first embodiment of the present invention for producing a plastic part for the plastic spherical mirror include the following steps:

a) The plastic part is designed so that a mirror surface is supported for the prevention of distortion or twisting;
b) The plastic injection gates are precisely placed for ensuring the elimination of remnants or knit lines created by plastic resin flow;
c) A preferred physical size of the plastic part for satisfying a plurality of optical performance requirements and physical design requirements is selected;
d) A plurality of support walls are formed and strategically placed in the plastic part;
e) A plastic material formulation is selected so that it is specifically designed to resist deformation;
f) The tool may also be made from a preferred grade of steel having a preferred polished finish;
g) The metal mold is to be heated and/or chilled to form an optimal curvature on a mirror surface;
h) A thin layer of a reflective metal coating is deposited onto the mirror surface of the plastic part; and
i) A protective overcoat is formed onto a metalized mirror surface.

By performing the above method for fabricating the plastic spherical mirror according to the first embodiment of the present invention, a plastic spherical mirror of the following descriptions is fabricated: a plastic part having the following: a mirror surface supported by a plurality of wall structures onto the edge of a mirror edge, a preferred physical size for the plastic part, a plastic material formulation, an excellent optical grade finish formed by polishing the mirror surface for a metal mold, an optimal curvature of the mirror surface produced by means of heating and chilling the metal mold, a thin layer of a reflective metal coating deposited onto the mirror surface, and a protective overcoat formed onto a metalized mirror surface. Furthermore, in a second embodiment, the plastic spherical mirror may further include a plurality of injection gates at a plurality of strategic locations and a preferred physical size for the plastic part. Additionally, a plurality of support walls may be disposed in the plastic part so that the final design dimensions of the plastic part are to match that of a glass counterpart in the second embodiment.

A third embodiment of the present invention also further provide an aerial display system having a novel bracket for positioning the mirror in proper alignment with the flat projection panel.

A fourth embodiment of the present invention may also further provide an aerial display system that has an open display region that creates the optical impression that the floating image is not associated with the housing. More specifically, in this fourth embodiment, the enclosure has an exposed beam splitter and polarizer without a hood or upper enclosure portion. The polarizer is positioned parallel and proximate to the beam splitter.

A fifth embodiment of the present invention may also further provide an aerial display system that includes a high definition display (HDD) that creates the optical impression for viewers that the floating image is a virtual three-dimensional image without glasses or distortion of the displayed image. In a sixth embodiment, the HDD is a high definition LCD or plasma display having at least 2000×2000 pixel resolution. In a seventh embodiment, the three-dimensional image is generated by an autostereoscopic display. In an eighth embodiment, a high-brighted autostereoscopic display to compensate for bright ambient lighting conditions is provided.

In a ninth embodiment, the display system does not include a hood over the beam splitter, and the circular polarizer is physically coupled to the beam splitter. This embodiment creates a three-dimensional television where the image appears to reside on the circular polarizer.

In a tenth embodiment of the present invention, an aerial display system is further provided that includes means for dissipating heat generated by the highbrighted display device. In an eleventh embodiment, a heat sink is attached to the back of the display device to draw heat away from the light generating components. In a twelfth embodiment, the airflow is increased behind the display device functions to draw heat away from the light generating components. Regardless of the embodiment selected to cool the display electronics, minimizing heat fatigue increases the working life of the display device.

Embodiments of the present invention also further provide an aerial display system that is readily configurable to display either a static object in a first configuration, or a video image in a second configuration. Importantly, the optical relationship between the displayed object or image is properly aligned with the optical components.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Figure 1:
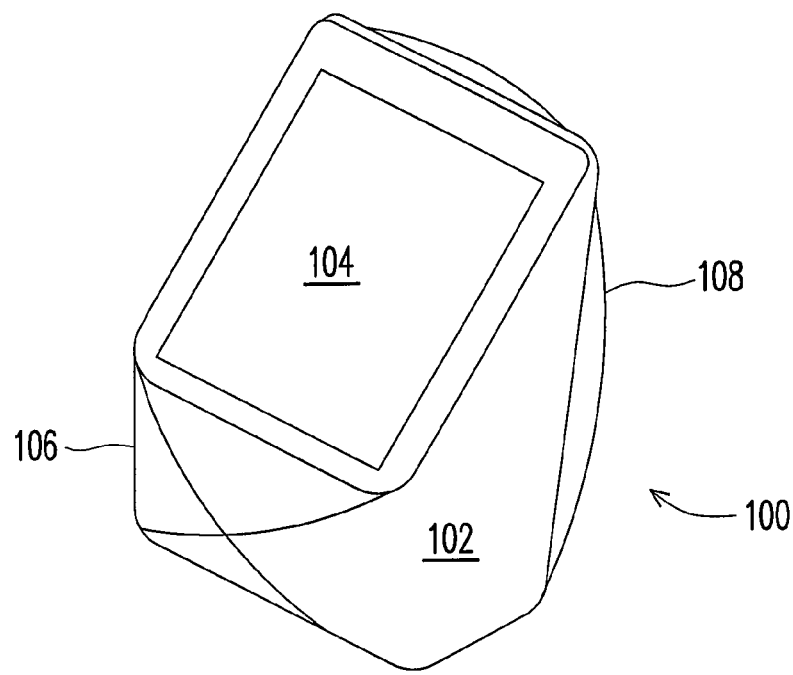
FIG. 1 is a perspective view of a display system in accordance with a plurality of embodiments of the present invention.

The present invention will now be described with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

In the drawings, whenever the same element reappears in subsequent drawings, it is denoted by the same reference numeral.

For the sake of convenience of understanding, some key terms and phrases are first presented.

A "plastic material formulation" may comprise of a homopolymer, a thermoplastic, a copolymer, a polymer blend, a thermoset, a polymer blend, any one of the above material containing performance additives, fillers, or fibers, or any other similar types of polymer material formulations.

The "depositing of a reflective metal coating onto the mirror surface of the plastic part" may be accomplished by vacuum deposition, spin coating, spraying, vacuum metallization, sputtering, or any other similar systems capable of depositing the reflective metal coating on the order of several microns.

"Low cost" may be defined as a favorable cost differential as compared to glass of the same dimensional configuration for use as spherical mirrors.

A "glass counterpart" is defined to be a glass spherical mirror of the same dimensional configuration and possesses equivalent functionalities as that of the plastic spherical mirror.

As used herein, the words "may" and "may be" are to be interpreted in an open-ended, non-restrictive manner. At minimum, "may" and "may be" are to be interpreted as definitively including structure or acts recited.

As used herein, a "computer" includes a system or mechanism that interprets and executes instructions (e.g. operating system code) and manages system resources. More particularly, a "computer" may accept, from a computer readable medium, a program as input, prepares it for execution, and executes the process so defined with data to produce results. A "computer" may include an interpreter, a complier, and run-time system, or other mechanism, together with an associated host computing machine and operating system, or other mechanisms for achieving the same effect. A "computer" may also include a central processing unit (CPU) that is a unit of a computing system which fetches, decodes, and executes programmed instructions and maintains the status of results as the program is executed. A CPU is the unit of a computing system that includes the circuits controlling the interpretation of instructions and their executions.

As used herein, a "computer program" or "operating system" may be any suitable program or sequence of coded instructions that are to be inserted into a computer, well known to those skilled in the art. Stated more specifically, a computer program is an organized list of instructions that, when executed, causes the computer to behave in a predetermined manner. A computer program contains a list of ingredients (called variables) and a list of directions (called statements) that tell the computer what to do with the variables. The variables may represent numeric data, text, or graphical images.

A "computer-readable medium" for purposes of the embodiments of the present invention may be any medium that can contain, store, communicate, propagate, or transport a program (e.g., a computer program) for use by and in connection with the instruction execution system, apparatus, system, or device. The computer-readable medium can be, by way of example only but not by limitation, an electronic, magnetic, optical, electromagnetic, infrared, or semiconductor system, apparatus, system, device, propagation medium, or computer memory.

Referenced throughout the specification, the respective appearances of the phrases "in one embodiment", "in an embodiment", or "in a specific embodiment" in the various locations throughout the specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments off the present invention described and illustrated herein are possible in light of the teachings herein and are to be considered as part of the spirit and scope of the present invention.

It will also be appreciated that one or more of the elements depicted in the drawings can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the descriptions herein and throughout the claims that follow, "a", "an", and "the" includes plural references unless the context clearly dictates otherwise. Also as used in the description herein and throughout the claims that follow, the meaning of "in" includes "in" and "on" unless the context clearly dictates otherwise.

Referring to FIG. 1, a perspective of an aerial display system 100 in accordance with a plurality of embodiments of the present invention for generating aerial images of objects or video images. The embodiments may comprise of a first, second, third, fifth, sixth, seventh, eighth, tenth, eleventh, and twelfth embodiment. More specifically, the aerial display system 100 has a generally oval-shaped enclosure 102 with a canted opening 104 through which the aerial image is projected. In a plurality of embodiments, a display device, positioned in the lower portion 106 of a display system 100, generates video images that appear as floating three-dimensional images. The display device may be a LCD panel, plasma display, or other display connected to a video source and capable of generating bright images on a black background at video rates. A computer or other sources such as DVD player, cable television signal, and the like provides images for the display device.

In another embodiment, a static display shelf replaces the display device so that an item, such as a piece of jewelry, hamburger or a basketball shoe can be displayed as a static aerial image. The video source and the static display shelf may be interchangeably positioned in the lower position 106 through an opening in the back panel 108 of the enclosure 100. The shelf properly positions the static object at the correct geometric coordinates for the proper display of the object. When the shelf is removed, the LCD display slides and is supported by the shelf support bracket to maintain the optical relationship between the displayed object and the video image with the optical components.

It is important to note that the cant of the window 104 enables the focal point to be moved back towards the window. The positioning of the image proximate to the window 104 provides a wider viewing angle and makes this design well suited for retail applications where the view or viewers may not be ideally positioned in front of the enclosure 100. Because there is no hood over or other light shield, it is preferred that the display device generate sufficient brightness to generate a bright, visible image in ambient lighting conditions.

In one embodiment, the aerial display system 100 is coupled to a communication network by the computer system and a communication device (not shown) that may be any type of communication types including but not limited to the following communication types: hard wired via a dial up telephone line, wireless via cellular telephone or satellite, a Wi-Fi network connection or an internet connection). The aerial display system 100 may utilize the cellular telephone network to transfer information stored on the computer to a central location to record daily sales or viewer demographics.

Figure 2:
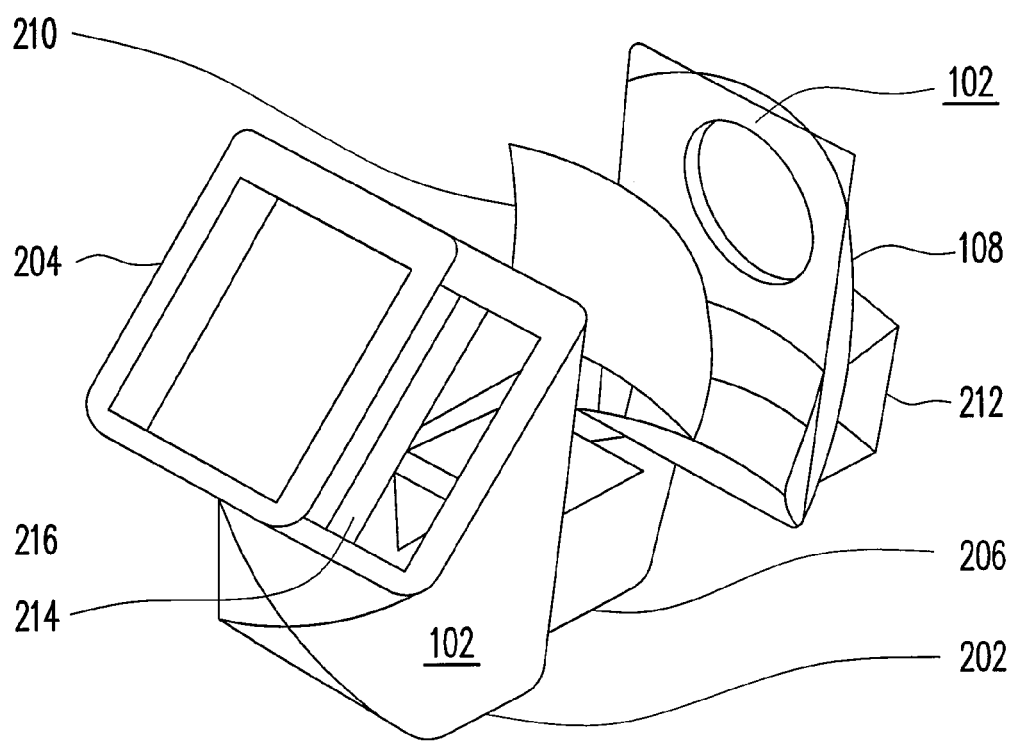
FIG. 2 is an exploded view of the display system of FIG. 1.

FIG. 2 is an exploded view of aerial display system 100 of FIG. 1. The enclosure 102 comprises a base 202, a top frame 204 and a back panel 108. The base 202 defines the volumetric region in which the video display device and the computer 206 or the shelf are positioned. The back panel 108 is attached to the base 202 by a tongue and complimentary groove and at least two spaced apart clasps. The base 202, the top frame 204, and the back panel 108 are lightweight molded plastic capable of retaining their shapes under the load created by the weight of the optical components. The base 202 maintains the optical components in optical alignment at a low cost having a minimum of components.

The back panel 108 includes an annular rib 208 that supports a portion of generally rectangular-shaped plastic spherical mirror 210. The side edges of the plastic spherical mirror 210 contact interior edges of the back panel 108 while the lower portion of the rib 208 supports the center portion of the plastic spherical mirror 210. Although not shown, a shelf or a pair of spaced-apart protrusions may further support the lower edge of the plastic spherical mirror 210. The plastic spherical mirror 210 may be coupled to the annular rib 208 and the shelf (or protrusions) by epoxy glue. The top edge of the plastic spherical mirror 210 may contact or abut a top interior edge of the back panel 108 to minimize movement of the plastic spherical mirror 210 should the back panel be shipped with the mirror attached.

An optional access port 212 provides easy access to the interior of the base 202 so that the display device and the computer 206 may be removed and an optional shelf inserted for static display of an object. In this manner, it is not necessary to remove the entire back panel but rather the access port 212 cover is removed, the display unit removed, and the static shelf positioned. The shelf dimensions are selected so that the top support surface of the shelf is at a lower level than the video display device. Thus, the optical alignment between the static display object and the optical elements are maintained.

In addition to the plastic spherical mirror 210, optical elements include a beam splitter 214 and either an anti-reflective coating 216. The anti-reflective layer or coating may also be a polymer that is applied to the outward facing surface of the beam splitter and will stop external images from being reflected by the mirror.

In other embodiments, the anti-reflective layer is combined with a polarizer 216. The polarizer 216 is proximate to and aligned with the beam splitter 214. Preferably, the polarizer 216 is coupled to the outer surface of the beam splitter 214. Further, it is preferred that the polarizer 216 is a linear polarizer with an anti-glare layer. In yet another embodiment, the polarizer is a circular polarizer without any anti-reflective coating. The beam splitter 214 and the polarizer 216 are positioned in a recess of the base 202 and is retained therein by the frame 204.

In a ninth preferred embodiment, the display system does not include a hood (or other light shield) over the beam splitter, and the polarizer 216 is a circular polarizer, which is aligned with the beam splitter, and is preferably physically coupled to the beam splitter. In this embodiment, the image appears to reside on the circular polarizer and gives the appearance of a three-dimensional television without the projection of any image.

Figure 3:
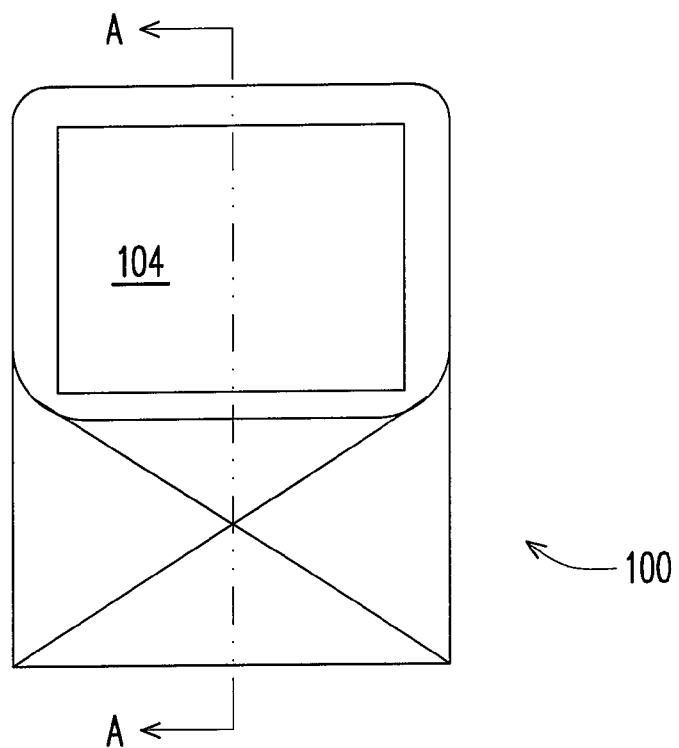
FIG. 3 is a front view of the display system of FIG. 1.
Figure 4:
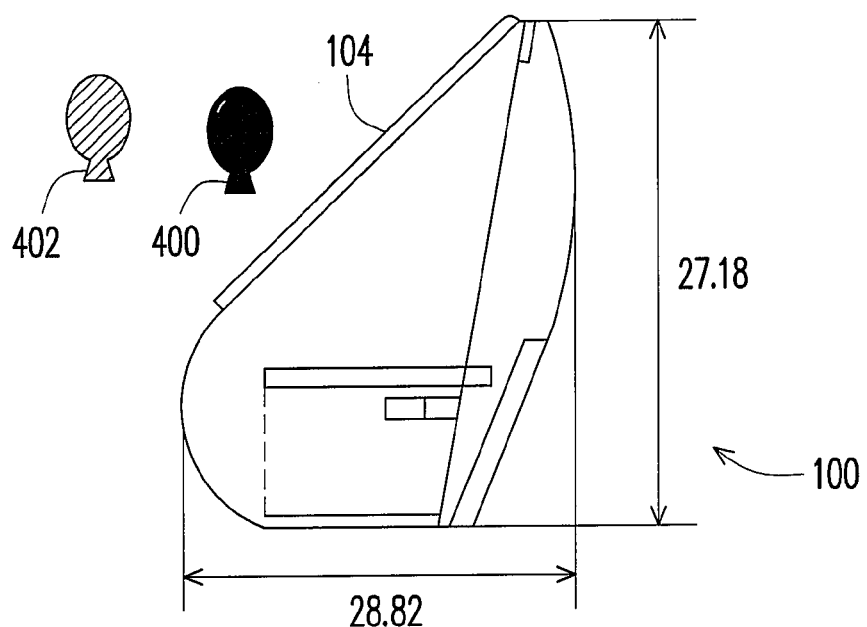
FIG. 4 shows a side sectional view of the display system of FIG. 1 taken along section line A-A.

The frame 204, the beam splitter 214, and the polarizer 216 define the window 104 through which the aerial images are projected. As illustrated in FIG. 3, which is a front view of the aerial display system 100, the window 104 of about 20 inches in width is provided above the lower portion 106 of the enclosure 102. A sectional side view of the aerial display system 100 taken along the sectional line A-A of FIG. 3 is shown in FIG. 4 together with an illustration of an aerial image 400. Because the polarizer is aligned with and proximate to the beam splitter, it is possible to move the focal point, which is the point in space where the image is formed, towards the beam splitter. Thus, rather than having an image generated further out, such as is illustrated at 402, the "hoodless" design of the present enclosure enables the projected image to be much closer to the beam splitter. This shorter focal distance enables a wider filed of view and perhaps, more importantly, a perceived wider field of view.

The dimensions of the aerial display system has, in one embodiment, a height dimension of about 27.19 inches, a width dimension of about 20 inches, and a depth dimension of about 20.82 inches. In this embodiment, the LCD display panel is at least a 17-inch diagonal display device. In an alternative embodiment, a miniature aerial display system is scaled down by approximately fifty-five percent so that the height dimension is approximately 12 inches. The LCD display panel is a high-bright 6-inch diagonal LCD display capable of projecting an image about six to ten inches in front of the beam splitter. The miniature system is an ideal desk-top unit for use with a standard LCD or plasma display.

Without a hood, it is critical that the display device comprises a high bright LCD display or other similar bright video image generating display devices. In the eighth embodiment, the display device is coupled to the computer 206 which functions as a video source although other alternative video sources may be employed. The high bright LCD display has a minimum luminance of about 1000 nits, although a typical luminance of about 1500 to 1600 nits is preferred. To extend the life of the system, the high bright LCD display is initially set to a selected luminance sufficient to display the aerial image in ambient light and then increased as the display ages or degrades. The selected luminance level is selected based on environmental considerations. The high bright LCD display must also have a high contrast ratio (such as at least 400:1) so that the images are vivid and visually attractive. To maintain the contrast ratio at high light conditions, the high bright LCD display will include a ZBEF filter.

Figure 5:
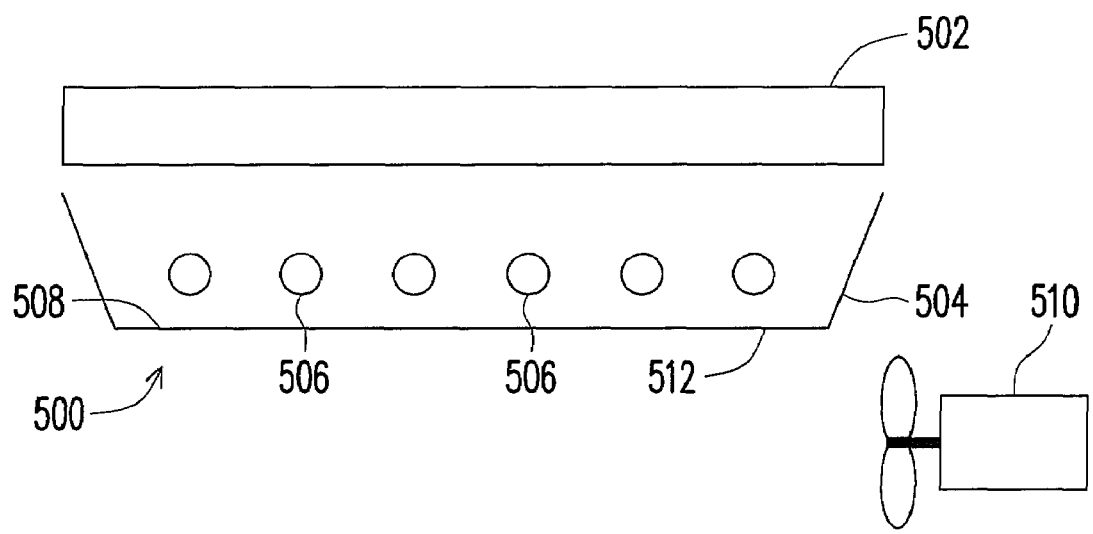
FIG. 5 is a schematic illustration of a preferred LCD display in accordance with the tenth, eleventh, and twelfth embodiment of the present invention.

FIG. 5 is a schematic illustration of a LCD display 500. The LCD display 500 comprises a LCD panel 502 and a lighting fixture 504. The lighting fixture 504 includes a plurality of light bulbs 506 and a reflector 508 on the inside surface of the lighting fixture 504. To minimize heat buildup, a fan 510 is mounted within about an inch of the back of the LCD display panel. A large heat sink 512 may also be coupled to the back-side of the panel to further minimize heat buildup. Alternatively, the back panel of the LCD display panel comprises an integral metal plate that functions to draw heat from the LCD panel. Thus the effectiveness of the fan will be greatly increased. The cooler panel will have an extended life expectancy compared to a high bright LCD display panel without any cooling considerations.

Referring again to FIGS. 1-4, the fifth and sixth embodiments of the present invention further include a high definition display (HDD) instead of a high bright LCD display. The HDD displays include LCD or plasma displays having at least 2000×2000 pixel resolution. The high resolution when combined with the optical elements of the aerial display system creates the optical impression for viewers that the floating image is a virtual three-dimensional image even if the image is of two-dimensional. In the seventh and eighth embodiment of the present invention, the high bright LCD display is replaced by an autostereoscopic 3D display. In the eighth embodiment, the autostereoscopic display is high brightened. As with the LCD display device, the computer, or a DVD player, coupled to the display device generates the video images for display.

The plastic spherical mirror 210 may be fabricated by using, according to the first and second embodiments of the present invention, plastic injection molding to be able to manufacturing a plastic part 20 for the plastic spherical mirror 210 of low-cost. In the first and second embodiments of the present invention, the injection molding method is able to yield a dimensional tolerance to as tight as +/−0.0001 inch. Although the tooling for the injection molding method is relatively expensive, the cost per each plastic part 20 manufactured is however very low. A plurality of complex geometries are reproducible using injection molding according to the first and second embodiments of the present invention and may be limited only by the manufacturability of a metal mold.

In the first embodiment of the present invention, a metal mold's final finish may be formed by means of machining and polishing or other similar methods of finishing capable of producing sufficient finish quality. The final finish may be at an A1 grade or a grade that is considered the finest finish available for a plastic part 20.

In the first embodiment of the present invention, using injection molding, parts up to about 20 inches in length may be produced. The procedures used in injection molding of plastic parts are well known in the art; therefore, no details shall be discussed herein.

In the first embodiment, a metal mold for injection molding is able to hold a plus or minus 0.030 inch tolerance for a general envelope dimension for a mirror (not the mirror surface 40). The spherical radius tolerance for the plastic spherical mirror 10 is capable of being held at a sufficient sphericity of plus or minus 0.05%. The aforementioned spherical radius tolerances are comparable to the glass spherical mirrors. The metal mold is able to hold up to a +/−0.0001 inch tolerance.

In the first embodiment of the present invention, a plurality of plastic material formulations 50 may each be used for the material for the plastic spherical mirror 10 in which a plurality of performance criteria including the following are satisfied: material strength, thermal stability, water absorption, mold shrinkage, material flow into the mold, UL recognition, manufacturing considerations, surface density, lubricant content, and scratch resistance.

In the first embodiment of the present invention, the plastic material formulation 50 may comprise of one of the following: optical-grade polycarbonate, natural-grade polycarbonate, UV-grade polycarbonate, polyetherimide, glass-filled grade polyetherimide, PMMA (acrylic), and other comparable plastic materials of having similar performance criteria. The selection of the plastic material formulation 50 may be based on the degree of precision for the mold tooling as well as experimental results from part testing.

In the first embodiment of the present invention, vacuum metallization or vacuum deposition may be used, in a metalizing phase, for coating the mirror surface 40 of the trimmed plastic part 25 as illustrated in FIG. 2 or the plastic spherical mirror 10 with an evaporated metal vapor. The metal deposited on the plastic surface is preferably to be at a thickness of about four to eight microns. The metalizing phase is followed by a spraying of a protective overcoat onto a metalized mirror surface 45. The metalized plastic part 30 that has been vacuum metalized may possess improved quality because of improved quality control of the surface of the plastic material that is being coated by means of the minimizing of the amount of flaws that are on the plastic surface resulting from the molding process. Furthermore, the metallization is to have excellent adhesion with respect to the mirror surface 40 of the underlying plastic part 20.

Figure 8:
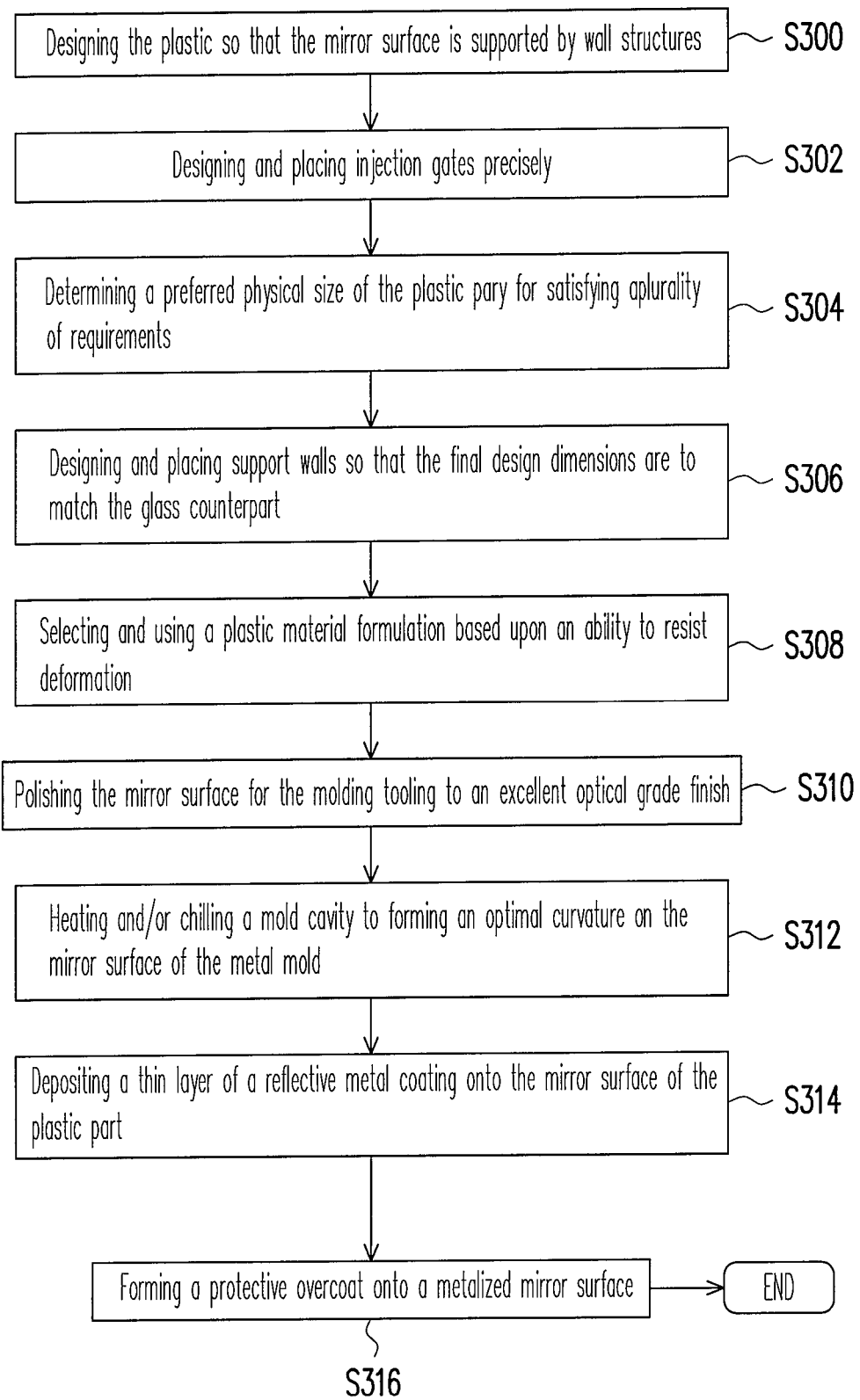
FIG. 8 is a flow diagram illustrating a method for producing the plastic spherical mirror according to the first embodiment of the present invention.

Referring to FIG. 8, in the first embodiment of the present invention, a method for producing the plastic spherical mirror 10, in which the plastic part 20 of relative thin thickness is to hold its form after it is heated and cooled, may include a plurality of the following steps:

Part Design a) Designing the plastic part so that the mirror surface is supported for preventing of distortion or twisting by designing a plurality of wall structures onto the entire edge of a mirror edge (S300);

b) Designing and placing a plurality of injection gates precisely with the intent of ensuring the elimination of remnants or knit lines created by plastic resin flow (S302);

c) Determining a preferred physical size of the plastic part for satisfying a plurality of optical performance requirements and physical design requirements (S304);

d) Designing and placing a plurality of support walls in the plastic part so that the final design dimensions of the plastic part are to match that of the glass counterpart (S306);

Material Selection
 a) Selecting and using a plastic material formulation based upon an ability to resist deformation according to a plastic part quality specification (S308);

Mold Tooling Processing
 a) Polishing the mirror surface for the metal mold to an excellent optical grade finish (S310);
 b) Heating and/or chilling a metal mold to form an optimal curvature on the mirror surface of the metal mold (S312);

Mirror Formation
 a) Depositing a thin layer of a reflective metal coating onto the mirror surface of the plastic part (S314); and
 b) Forming a protective overcoat onto a metalized mirror surface (S316).

Figure 6:
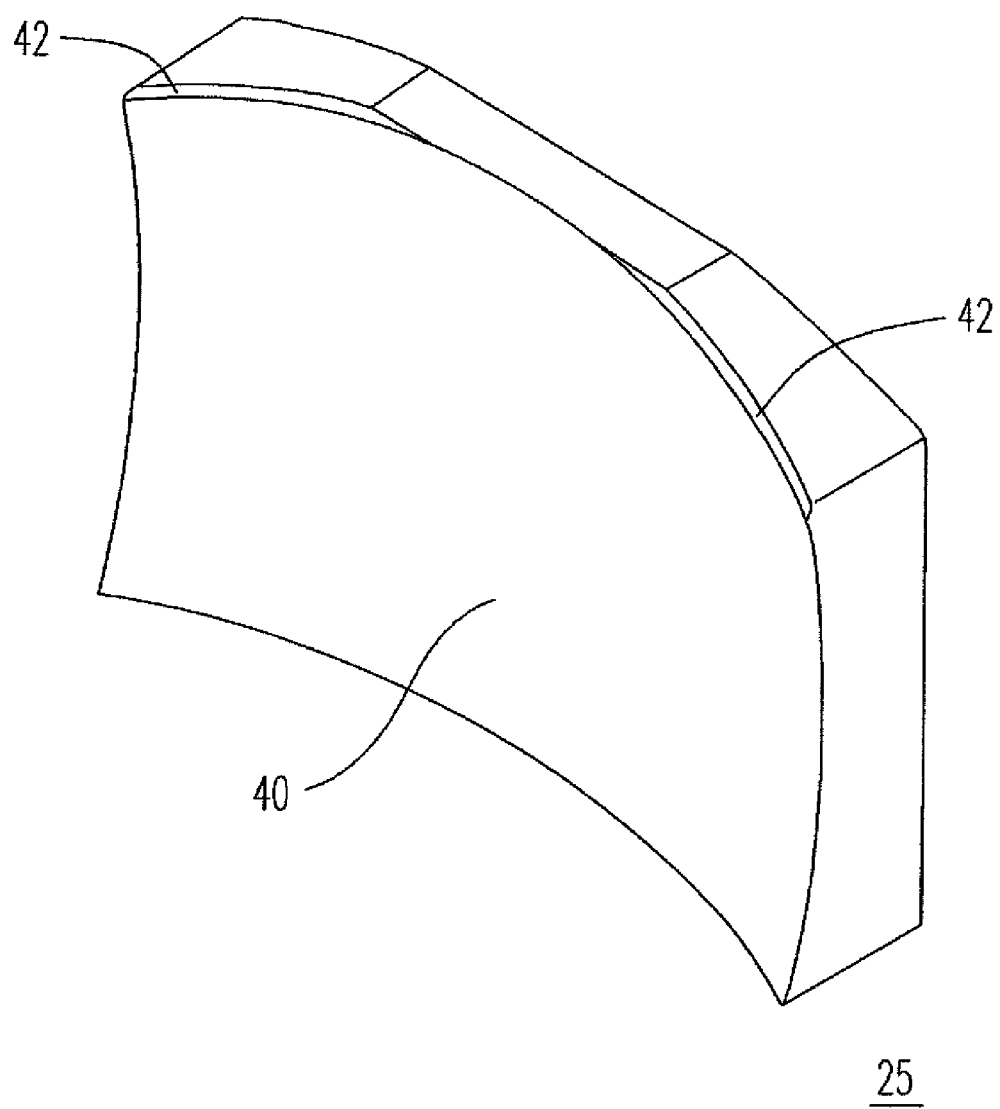
FIG. 6 illustrates a trimmed plastic part for use for a plastic spherical mirror in accordance with the first through twelfth embodiment of the present invention.

Referring to FIG. 6, a trimmed plastic part 25 which has been trimmed for use for a plastic spherical mirror 210 of FIG. 2 in accordance with the first embodiment of the present invention is illustrated. The plastic spherical mirror includes the plastic part 25 with a mirror surface 40 and a plurality of support walls 42 disposed in the plastic part 25.

Figure 9:
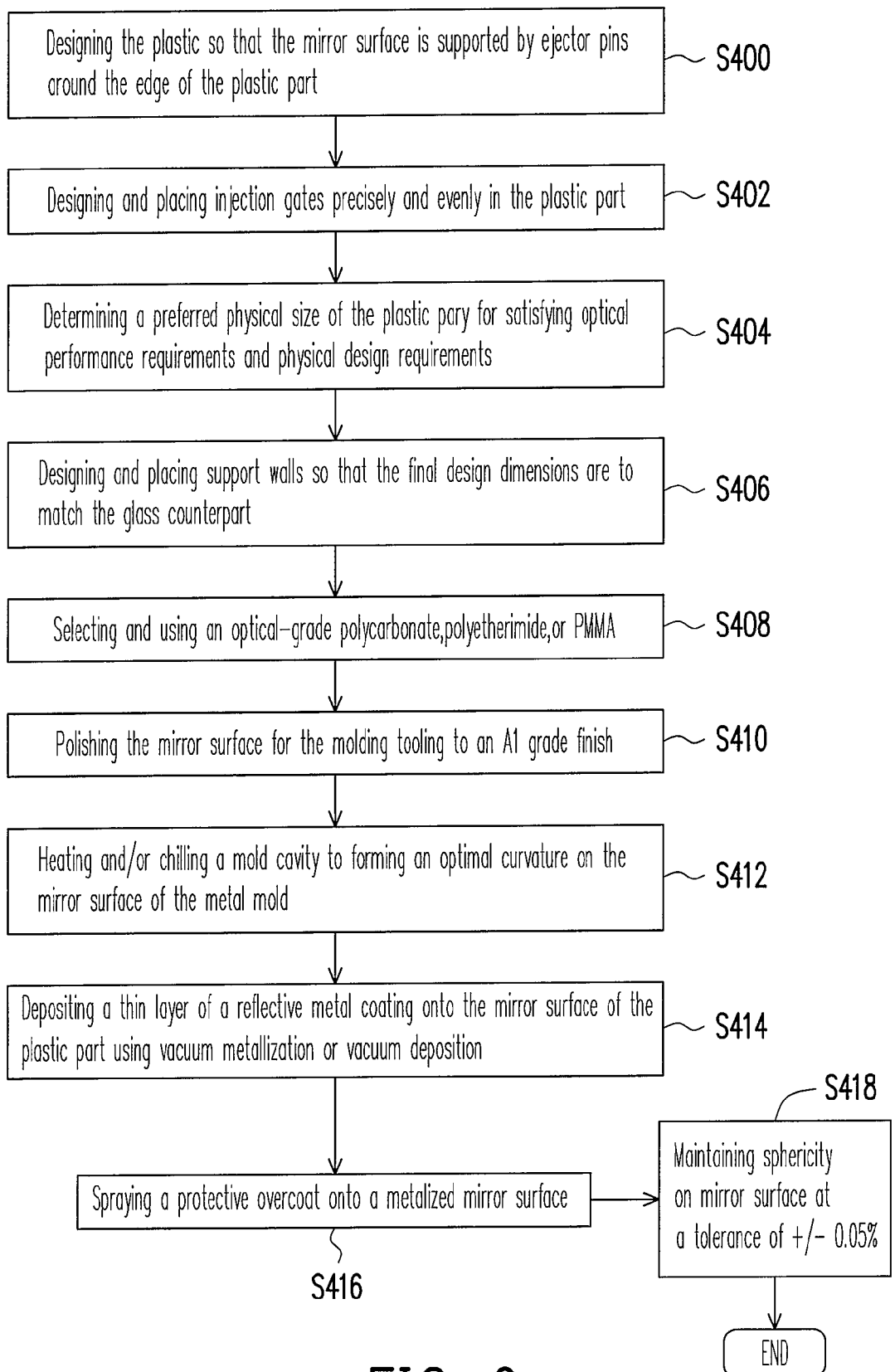
FIG. 9 is a flow diagram illustrating a method for producing the plastic spherical mirror according to the second embodiment of the present invention.

Referring to FIG. 9, in the second embodiment of the present invention, a method for producing the plastic spherical mirror 10, in which the plastic part 20 of relatively thin thickness is to hold its form after it is heated and cooled, may include a plurality of the following steps:

Part Design
 a) Designing the plastic part so that the mirror surface is supported for preventing of distortion or twisting by designing a plurality of ejector pins, such as 28 ejector pins, around the edge of the plastic part serving to allow for part removal from the metal mold without distorting the surface geometry or damaging the mirror surface finish (S400);
 b) Designing a plurality of plastic injection gates and placing the plastic injection gates precisely and evenly in the plastic part (S402);
 c) Determining a preferred physical size of the plastic part for satisfying a plurality of optical performance requirements and physical design requirements (S404);
 d) Designing and placing a plurality of support walls strategically in the plastic part (S406).

Material Selection
 a) Selecting and using an optical-grade polycarbonate, polyetherimide, or PMMA (acrylic) as the plastic material formulation for use as the plastic spherical mirror (S408);

Mold Tooling Processing
 a) Polishing the mirror surface for the metal mold using high grade steel to an A1 finish (S410);
 b) Heating and/or chilling a mold cavity to forming an optimal curvature on the mirror surface of the metal mold (S412);

Mirror Formation
 a) Depositing a thin layer of a reflective metal coating onto the mirror surface of the plastic part using vacuum metallization or vacuum deposition at
  preferably a thickness of four to eight microns (S414);
 b) Spraying a protective overcoat onto a metalized mirror surface (S416);

Finished Part Inspection
 a) Maintaining sufficient sphericity on the mirror surface of the plastic spherical mirror, which is equivalent to sphericity at a tolerance of +/−0.05% (S418).

Figure 7:
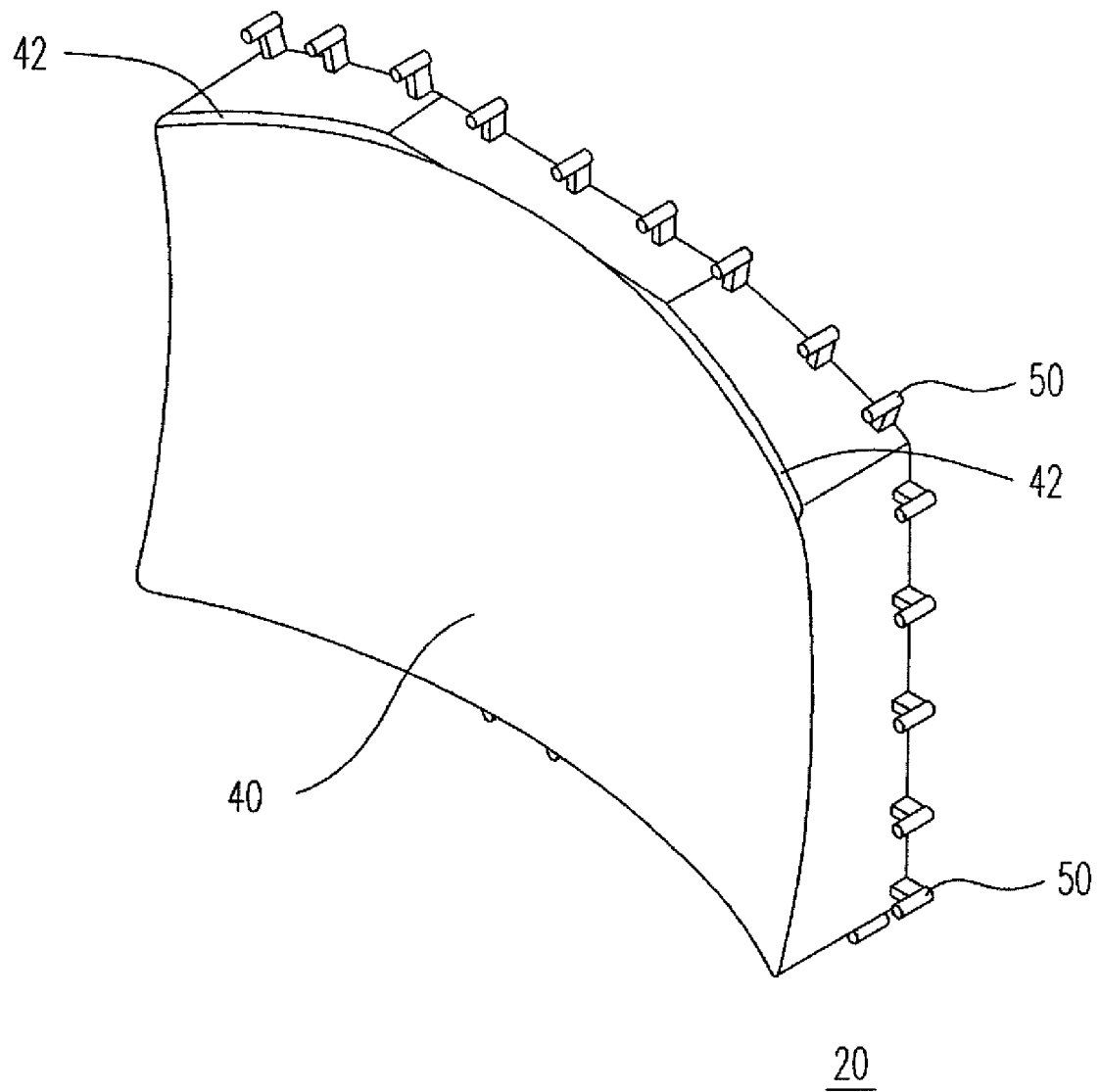
FIG. 7 illustrates a plastic part directly after injection molding in accordance with first, and third through twelfth embodiment of the present invention.

Referring to FIG. 7, a plastic part 20 directly after injection molding in accordance with the first embodiment of the present invention is illustrated. The plastic spherical mirror includes the plastic part 20 with a mirror surface 40 and a plurality of support walls 42 disposed in the plastic part 20. The ejector pins 50 are disposed around the edge of the plastic part serving to allow for part removal from the metal mold without distorting the surface geometry or damaging the mirror surface 40.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modification are possible within the spirit and scope of the present invention, as those skilled in the relevant art will recognize and appreciate. As indicated, these modifications may be made to the present invention in light of the foregoing description of the illustrated embodiments of the present invention and are to be included within the spirit and scope of the present invention.

Thus, while the present invention has been described herein with reference to particular embodiments thereof, a latitude of modifications, various changes and substitutions are intended in the foregoing disclosures, and it will be appreciated that in some instances some features of the embodiments of the present invention will be employed without a corresponding use of other features without departing from the scope and spirit of the present invention as set forth. Therefore, many modifications may be made to adapt a particular situation or material to the essential scope and spirit of the present invention. It is intended that the invention not to be limited to the particular terms used in the following claims and/or to the particular embodiment disclosed as the best mode contemplated for carrying out this invention, but that the invention will include any and all embodiments and equivalents falling within the scope of the appended claims.

What is claimed is:

1. An aerial display device, comprising:
 an enclosure having a lower portion, a back panel, and a top frame;
 a plurality of optical elements including a beam splitter in optical alignment with a plastic spherical mirror and an anti-reflective acrylic plastic to stop reflections from reaching the plastic spherical mirror; the beam splitter and the anti-reflective acrylic plastic positioned in a recess of the enclosure and retained therein by the top frame, wherein the plastic spherical mirror comprises a plastic part and a plurality of support walls disposed in the plastic part;
 a video source; and
 a display device, coupled to the video source for displaying a plurality of video images received from the video source, and positioned in the lower portion of the enclosure and in optical alignment with the optical elements such that an aerial display of the video images is displayed.

2. The aerial display device of claim 1, wherein the plastic part further comprises:
 a mirror surface supported by a plurality of wall structures onto an edge of a mirror edge, wherein the mirror surface comprises a sphericity, a physical size, a grade finish and a curvature, wherein the plastic part comprises a plastic material formulation, and
 the plastic spherical mirror further comprises:
 a thin layer of a reflective metal coating; and
 a protective overcoat formed onto the mirror surface.

3. The aerial display device of claim 2, wherein the final design dimensions of the plastic part match that of a glass counterpart.

4. The aerial display device of claim 2, wherein the plastic material formulation of the plastic part is selected from the group consisting of an optical-grade polycarbonate, a natural-grade polycarbonate, a UV-grade polycarbonate, a polyetherimide, a glass-filled grade polyetherimide, and a PMMA (acrylic).

5. The aerial display device of claim 2, wherein the mirror has less than one surface defect per million surface areas.

6. The aerial display device of claim 1, wherein the display device comprises an LCD display.

7. The aerial display device of claim 6 further comprising a cooling fan proximate to the back of the high brightened LCD display.

8. The aerial display device of claim 7 further comprising a heat sink positioned between the high brightened LCD display and the fan.

9. The aerial display device of claim 1 wherein the display device comprises an autostereoscopic display.

10. The aerial display device of claim 9, wherein the autostereoscopic display comprises a contrast ratio of at least 400:1.

11. The aerial display device of claim 9 further comprising a cooling fan proximate bulb side of the autosteroscopic display.

12. The aerial display device of claim 11 further comprising a heat sink positioned between the autostereoscopic display and the fan.

13. The aerial display device of claim 1, wherein the display comprises a high definition display.

14. The aerial display device of claim 13, wherein the high definition display comprises a contrast ratio of at least 400:1.

15. The aerial display device of claim 1, wherein the focal point is proximate to the anti-reflective acrylic plastic.

* * * * *